US012763480B1

(12) United States Patent
McCarrick

(10) Patent No.: US 12,763,480 B1
(45) Date of Patent: Oct. 13, 2026

(54) COPLANAR SLOT ANTENNA HAVING DIELECTRIC-FILLED RADIAL, TRANSVERSE, CONCENTRIC ARC, AND PERIMETER TIP SLOTS IN A CONTINUOUS CONDUCTIVE DISC FOR HORIZONTALLY POLARIZED AZIMUTHALLY OMNIDIRECTIONAL RADIATION

(71) Applicant: Micro-Ant, LLC, Jacksonville, FL (US)

(72) Inventor: Charles McCarrick, Jacksonville, FL (US)

(73) Assignee: Micro-Ant, LLC, Jacksonville, FL (US)

( * ) Notice: Subject to any disclaimer, the term of this patent is extended or adjusted under 35 U.S.C. 154(b) by 0 days.

(21) Appl. No.: 19/637,180

(22) Filed: Apr. 2, 2026

(51) Int. Cl.
*H01Q 13/18* (2006.01)
*H01Q 1/12* (2006.01)

(52) U.S. Cl.
CPC ............... *H01Q 13/18* (2013.01); *H01Q 1/12* (2013.01)

(58) Field of Classification Search
CPC ........ H01Q 21/00; H01Q 13/18; H01Q 1/244; H01Q 1/12; H01Q 1/22
See application file for complete search history.

(56) References Cited

U.S. PATENT DOCUMENTS

2023/0393272 A1* 12/2023 Siddiq ................. G01S 15/8922
2024/0316350 A1* 9/2024 Hoss ...................... H01Q 1/273

* cited by examiner

*Primary Examiner* — Peguy Jean Pierre
(74) *Attorney, Agent, or Firm* — Mark Young, PA; Mark Young

(57) ABSTRACT

A coplanar slot antenna includes a generally planar continuous conductive disc supported by a dielectric substrate, wherein radiating features are defined by removing conductive material to form dielectric-filled slot openings. A central radial feed slot terminates inward of the disc periphery and intersects a transverse slot to form a T-shaped slot junction with opposing arms. The slot geometry transitions into opposing arcuate slots that are concentric with the disc and arranged in mirrored relationship, and into linear tip slots oriented substantially parallel to the feed slot and extending to the disc periphery. A coplanar feed structure applies radio-frequency excitation across the feed slot with ground and signal conduction pathways disposed in the same plane as the disc. The slot geometry induces circumferential surface currents in the disc and provides horizontally polarized, substantially azimuthally omnidirectional radiation in a horizontal plane, suitable for utility telemetry and other low-profile near-ground deployments.

20 Claims, 5 Drawing Sheets

COPLANAR SLOT ANTENNA HAVING DIELECTRIC-FILLED RADIAL, TRANSVERSE, CONCENTRIC ARC, AND PERIMETER TIP SLOTS IN A CONTINUOUS CONDUCTIVE DISC FOR HORIZONTALLY POLARIZED AZIMUTHALLY OMNIDIRECTIONAL RADIATION

FIELD OF THE INVENTION

The invention relates to antennas and radio-frequency (RF) radiators, and more particularly to coplanar slot antennas configured to provide horizontally polarized, azimuthally-omnidirectional radiation from a low-profile structure.

BACKGROUND OF THE INVENTION

Wireless telemetry systems are widely deployed to transmit data from remote or distributed assets to a collection network. Utility meters and other field-deployed sensors often operate from underground or near-ground enclosures, pits, vaults, curb boxes, or similar environments where moisture, soil, concrete, and nearby metal structures attenuate RF signals and detune antennas. These environments can substantially reduce range, increase packet loss, and demand higher transmit power, which shortens battery life.

Conventional compact antennas used in these installations frequently rely on printed conductive traces formed on dielectric substrates. Such trace-based radiators can be sensitive to detuning from nearby water, soil, plastic housings, and metal structures. They may also exhibit pronounced pattern nulls or orientation sensitivity, resulting in performance that varies depending on how a device is installed or rotated within a housing. Many low-profile antennas also tend to produce unwanted vertical polarization components, which can be less effective for near-ground propagation in certain deployment scenarios.

Further, integrating an antenna with a device housing can impose strict constraints on height, footprint, manufacturability, durability, and long-term stability. Where low-profile form factors are required, designers may attempt to use a variety of compromises, including shorter radiators, partial grounds, or multi-layer feed structures, which can increase complexity and reduce repeatability.

Accordingly, there exists a need for a compact, mechanically robust, low-profile antenna architecture that can be manufactured repeatably, that is tolerant of deployment in harsh near-ground environments, and that provides horizontally polarized, azimuthally omnidirectional radiation with reduced orientation sensitivity. The invention is directed to overcoming one or more of the problems and solving one or more of the needs as set forth above.

SUMMARY OF THE INVENTION

It is an object of the invention to provide a compact, low-profile antenna capable of producing horizontally polarized, azimuthally omnidirectional radiation, particularly in near-ground and underground deployment environments. It is also an object of the invention to provide an antenna architecture that reduces sensitivity to rotational orientation, installation variability, and detuning influences from nearby water, soil, concrete, plastic housings, and metallic structures. It is a further object of the invention to provide an antenna that is mechanically robust and repeatable in manufacture, and that can be implemented as a coplanar structure in which ground and signal conduction pathways, a transmission line feed network, and radiating features are formed in a single plane. It is also an object of the invention to provide an antenna structure that achieves efficient resonance within a constrained footprint without requiring protruding whips, multi-layer feed networks, deep cavities, or complex three-dimensional dielectric shaping. It is another object of the invention to provide a slot-based radiator whose operative radiating geometry is defined by removal of conductive material from a continuous conductive sheet, rather than by addition of conductive traces.

In accordance with these and other objects, an antenna apparatus is provided that includes a generally planar continuous conductive disc supported by a dielectric substrate and configured as a coplanar structure. The conductive disc defines a primary conductive sheet, and a plurality of dielectric-filled slot openings is formed through the conductive disc to define radiating apertures. A central radial feed slot extends from a central region of the disc and terminates inward of a peripheral edge such that a continuous conductive boundary is preserved around the periphery except where interrupted by defined perimeter-coupling features. A transverse slot intersects the central radial feed slot at or near the central region to define a generally T-shaped slot junction having opposed arms that extend in opposing directions and terminate inward of the peripheral edge, thereby splitting excitation symmetrically and shaping fields and currents to promote horizontal polarization. The slot geometry transitions into a pair of arcuate slots that intersect respective arms of the transverse slot, are concentric with the disc, and are disposed in mirrored relationship about an axis defined by the central radial feed slot, whereby effective electrical length is increased within a compact footprint and circumferential surface currents are guided around the disc to suppress azimuthal nulls. Linear tip slots are coupled to ends of the arcuate slots and extend to the peripheral edge, the linear tip slots being oriented substantially parallel to the central radial feed slot to provide tuning and controlled coupling while maintaining symmetry and polarization purity.

A coplanar feed structure is coupled to the antenna such that both ground and signal conduction pathways of the feed structure are disposed in the same plane as the conductive disc, and radio-frequency excitation is applied across opposing edges of the central radial feed slot. In operation, the slot geometry induces circumferential surface currents in the conductive disc and provides a hemispherical, substantially azimuthally omnidirectional radiation pattern in a horizontal plane, with reduced sensitivity to rotational orientation and improved suitability for utility telemetry systems and other low-profile RF devices deployed in harsh near-ground environments. In additional aspects, the antenna may be mounted to a cover for a telemetry unit housing having a rim and a substantially planar surface, and the antenna may be excited by a communication module of the telemetry unit for transmitting and/or receiving RF signals using the described horizontally polarized, azimuthally omnidirectional pattern.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION OF THE INVENTION

Referring to FIGS. 1-5, an exemplary system according to principles of the invention may include a housing cover 100 for a telemetry unit used with a utility meter, and an antenna 200 mounted to the cover 100 and electrically coupled to a communication module of the telemetry unit. The utility meter may be a water meter, gas meter, electric meter, or another measurement device deployed in a near-ground or underground environment. Although the drawings illustrate a cover for a telemetry housing in a utility metering context, it will be appreciated that the antenna 200 may be used in other applications that benefit from horizontally polarized, azimuthally omnidirectional radiation from a low-profile coplanar structure, including without limitation remote sensing nodes, industrial telemetry devices, asset trackers, and other field-deployed RF systems.

Figure 1:
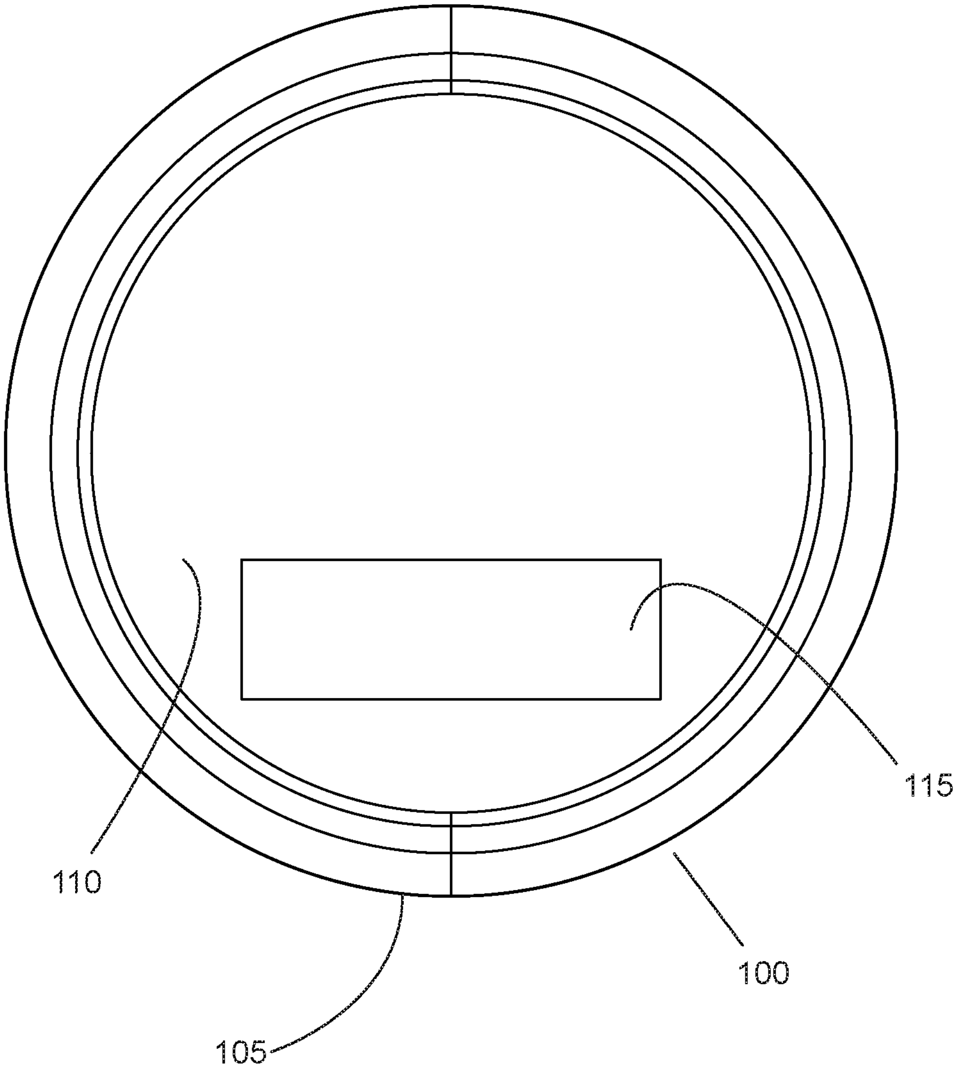
FIG. 1 is a plan view of a nonlimiting example of a cover for a housing for a telemetry unit for a utility meter according to principles of the invention.
Figure 2:
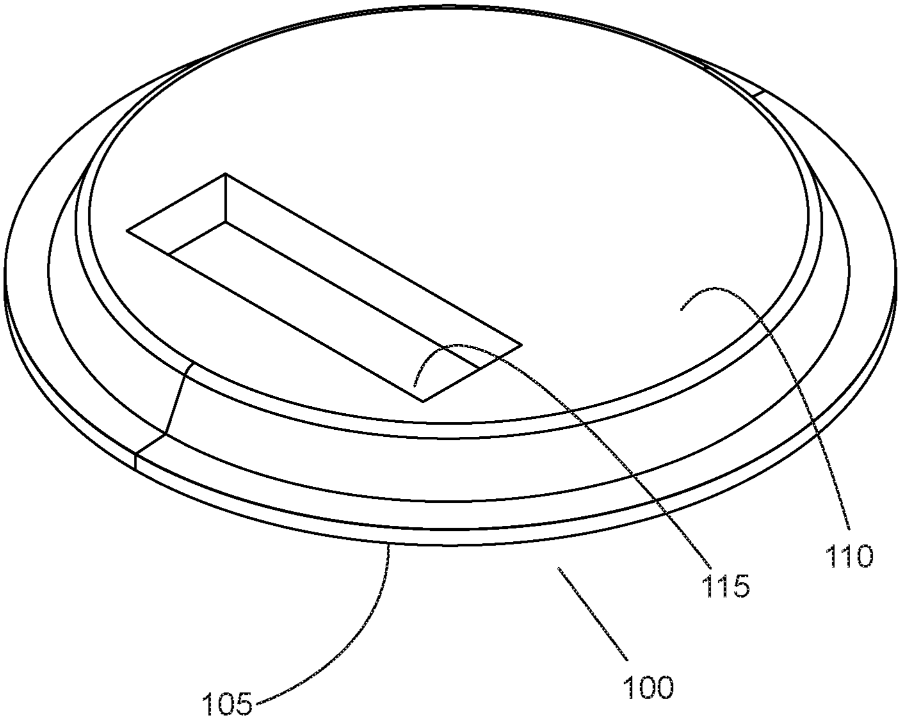
FIG. 2 is a top perspective view of a nonlimiting example of a cover for a housing for a telemetry unit for a utility meter according to principles of the invention.
Figure 3:
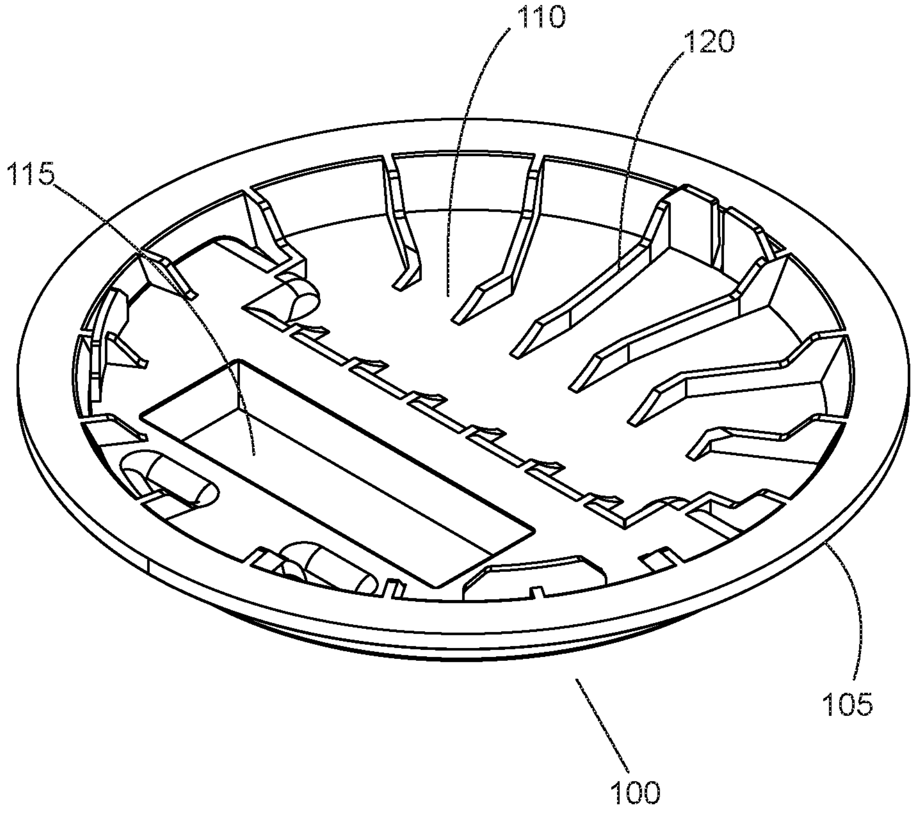
FIG. 3 is a bottom perspective view of a nonlimiting example of a cover for a housing for a telemetry unit for a utility meter according to principles of the invention.

As best shown in FIGS. 1-3, the cover 100 may be formed as a molded polymer component configured to close, protect, or support a telemetry unit within a pit-lid assembly, curb box, or other enclosure. The cover 100 may include an outer rim 105 configured to engage a mating housing portion and to define a peripheral boundary. A substantially planar upper surface 110 may be provided, which may serve as a mounting surface for the antenna 200 and/or a substrate or carrier that supports the antenna 200. In some embodiments, the surface 110 is configured to present a relatively consistent dielectric environment proximate the antenna 200, thereby improving repeatability of tuning and pattern characteristics across production units. A window 115 may be formed in the surface 110 to provide access to a display, a label, an indicator, a programming interface, a control actuator, or other component of the telemetry unit. As shown in FIG. 3, a lower portion of the cover 100 may include ribs 120, bosses, webs, or other reinforcement structures configured to provide stiffness, distribute mechanical loads, and allow the cover 100 to bear weight, resist deformation, and withstand field loads such as foot traffic, soil pressure, and incidental impact. The ribs 120 may be arranged to avoid detuning effects on the antenna 200, including by locating thicker reinforcement features away from the central radiating region or by employing polymer thickness profiles that reduce abrupt dielectric discontinuities adjacent the antenna 200.

A telemetry unit installed within or under the cover 100 may include a meter interface module that senses usage or consumption information, a microprocessor or data logging module that processes and stores measurement data, a communication module that transmits and/or receives RF signals, and a power source such as a high-capacity battery designed for long service life. In implementations where the telemetry unit is installed in a pit or near-ground enclosure, the communication module is desirably coupled to an antenna that exhibits stable impedance and pattern characteristics in the presence of water, soil, concrete, and nearby metal, and that reduces sensitivity to the rotational orientation of the installation. The antenna 200 described herein addresses these needs using a coplanar slot architecture that integrates ground plane, transmission line feed network, and radiating features in a single plane.

Figure 4:
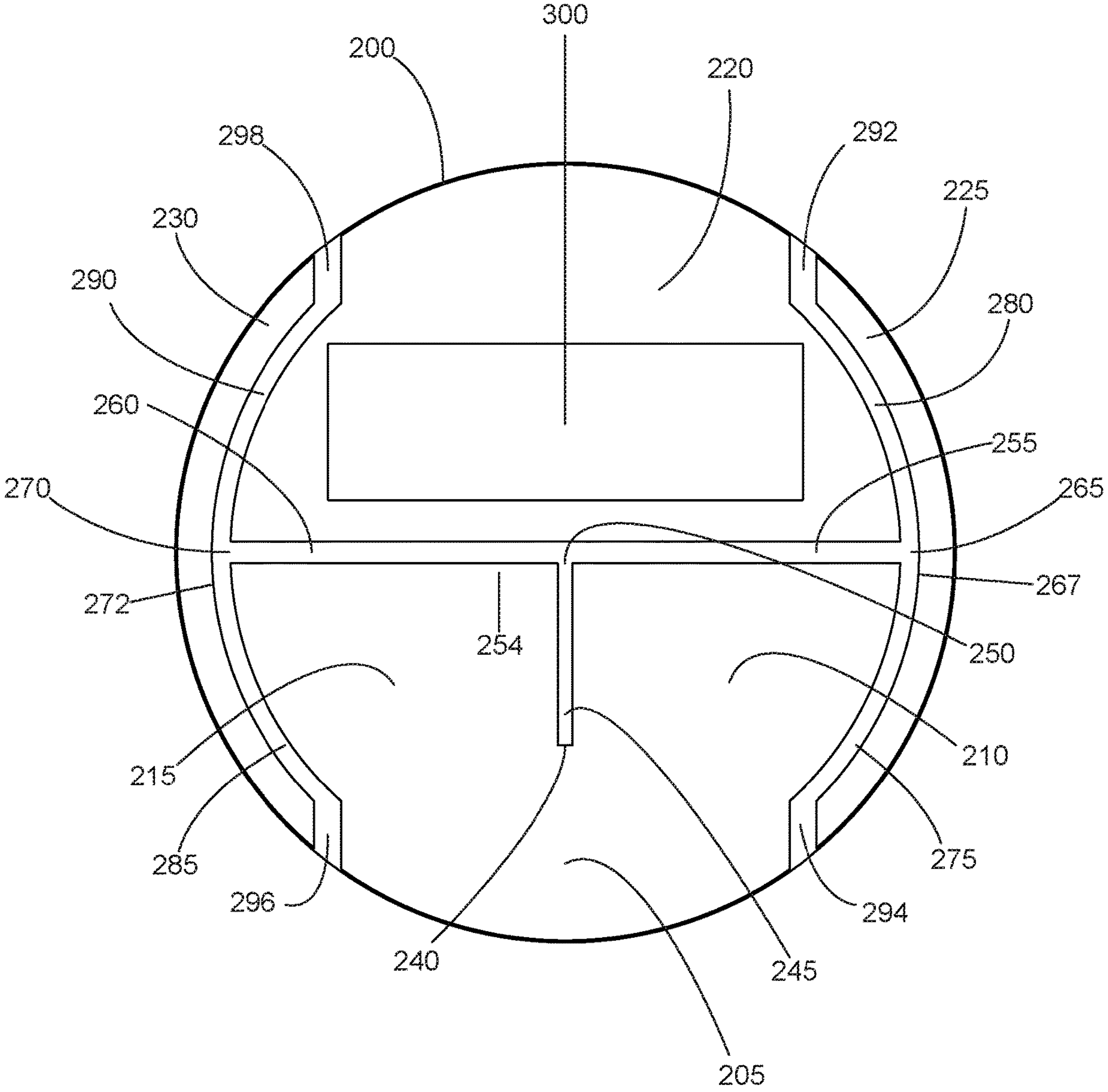
FIG. 4 is a plan view of an exemplary horizontally polarized, azimuthally-omnidirectional antenna constructed on a co-planar structure which includes ground plane, transmission line feed network and radiating elements according to principles of the invention.
Figure 5:
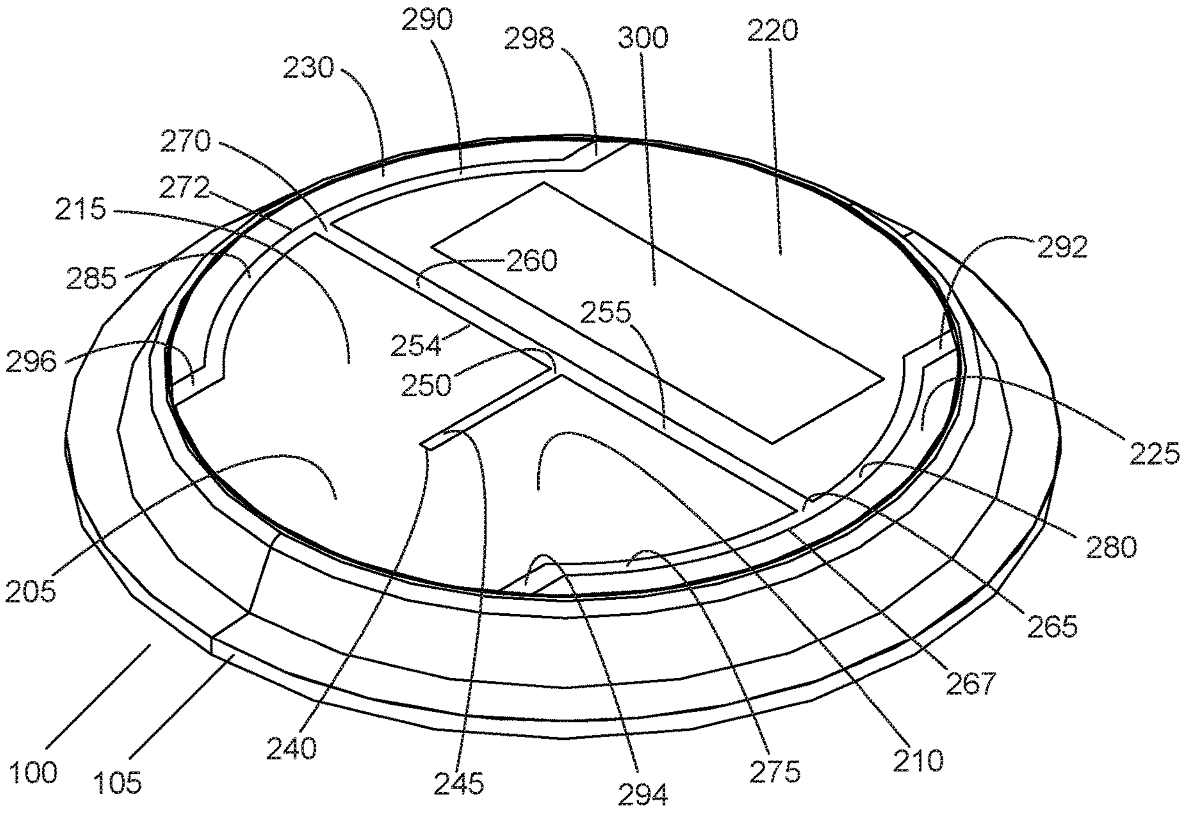
FIG. 5 is a perspective view of the exemplary horizontally polarized, azimuthally-omnidirectional antenna constructed on a co-planar structure which includes ground plane, transmission line feed network and radiating elements according to principles of the invention, as shown in FIG. 4, mounted on top of a cover for a telemetry unit for a utility meter according to principles of the invention.

Referring now to FIGS. 4 and 5, the antenna 200 comprises a generally planar conductive disc 205 that serves as the primary conductive structure and may be formed of copper or another electrically conductive material suitable for RF operation. In contrast to trace-based printed antennas in which radiating features are defined by adding conductive traces on a dielectric, the antenna 200 is defined by removing portions of the conductive disc 205 to form a set of slot openings. In the illustrated embodiment, the slot openings are occupied entirely by dielectric material, such as FR-4, which may be the underlying substrate on which the disc 205 is formed or laminated. In this architecture, the conductive disc 205 provides a continuous conductive sheet that functions as a ground reference and current-carrying body, while the dielectric-filled cutouts define slot geometries that act as radiating apertures when excited. The resulting structure is advantageously robust, low profile, and repeatable in manufacture because the operative geometry is defined by etched, machined, stamped, or otherwise formed voids in the conductive sheet rather than by thin conductive traces that can be sensitive to damage or detuning.

The antenna 200 is preferably configured as a coplanar structure in which the ground and signal conduction pathways are disposed in the same plane and the feed network is coplanar with the radiating slot structure. In one nonlimiting implementation, the conductive disc 205 forms a ground plane region and a signal region arranged to define a coplanar transmission line feed, such as a coplanar waveguide or coplanar strip arrangement, that terminates at or near a central excitation region of the slot geometry. In another implementation, a feed conductor from an RF transceiver module may be coupled to the slot geometry using a planar feed pad and a return pad located in the same plane, thereby applying an RF potential across selected edges of a feed slot. In each case, the feed architecture is configured to excite the slot geometry while maintaining a substantially single-plane conductive topology that supports stable performance and simplifies assembly within a low-profile housing.

The slot geometry may include a central radial feed slot 245 that acts as a primary excitation aperture. The central radial feed slot 245 may originate at or near a center region 250 of the conductive disc 205 and extend radially outward in a direction toward the periphery. In the illustrated embodiment, the length of the slot 245 is approximately one-half of the radius of the disc 205, optionally within a tolerance band such as plus or minus ten percent, although other lengths may be employed without departing from the principles of the invention provided the resulting structure maintains desired impedance and pattern stability. The slot 245 terminates at a terminus 240 that is between the center 250 and the peripheral edge of the disc 205, leaving a continuous conductive boundary around the outer periphery of the disc 205. This preserved continuous peripheral boundary is advantageous because it supports a continuous circumferential current path and reduces pattern distortion, while also allowing the slot geometry to be excited without introducing an abrupt peripheral discontinuity that could create unwanted asymmetry or nulls.

At or near the center 250 of the disc 205, the central radial feed slot 245 intersects a transverse slot 254 to form a T-shaped slot junction. In the illustrated embodiment, the transverse slot 254 includes opposed arms 255 and 260 extending in generally opposite directions from the intersection region. The arms 255 and 260 are preferably arranged substantially orthogonal to the central radial feed slot 245, and the T-shaped relationship assists in distributing excitation symmetrically into opposing azimuthal current paths in the conductive disc 205. Each arm 255 and 260 may have a length that is less than the disc radius, and in one nonlimiting example each arm length is approximately three-quarters to seven-eighths of the disc radius, although other proportions may be employed depending on target operating frequency, dielectric properties, and packaging constraints. The arms 255 and 260 preferably terminate inward of the disc periphery such that the periphery remains a continuous conductive boundary. The T-shaped slot junction contributes to suppression of undesired vertically polarized radiation components by promoting balanced excitation and by shaping fields and currents so that horizontal polarization components dominate for near-ground propagation.

At outer ends 265 and 270 of the arms 255 and 260, the slot geometry transitions into arcuate slots 267 and 272 that form opposing C-shaped slot structures. In the illustrated embodiment, each arcuate slot 267, 272 is generally concentric with the disc 205 and has a radius of curvature that is a substantial fraction of the disc radius, such as in a range from about one-half to about seven-eighths of the disc radius, with the two arcuate slots preferably having substantially the same radius of curvature. Each arcuate slot may subtend an arc of less than 180 degrees, and in nonlimiting examples may be 160 degrees or less, and more preferably about 130 degrees, although these values may be adjusted to tune resonance and impedance. The opposing arcuate slots 267 and 272 are arranged in mirrored relationship across an axis defined by the central radial feed slot 245, such that if the disc 205 were conceptually folded along the axis of the slot 245 the arcuate slots would substantially align. This symmetry is advantageous because it promotes a uniform azimuthal radiation pattern and reduces orientation sensitivity.

In the illustrated embodiment, each arm 255 and 260 may bisect a respective arcuate slot 267 and 272, dividing each arcuate slot into two arcuate halves. More particularly, arcuate slot 267 is divided into halves 275 and 280, and arcuate slot 272 is divided into halves 285 and 290, with the division occurring at the intersection between the arm and the arcuate slot. This bisected arcuate configuration may assist in distributing current and field excitation around the disc and may improve repeatability in tuning. The arcuate slots function to extend the effective electrical length of the antenna within a compact footprint and to redirect surface current flow to follow circumferential paths around the disc rather than terminating abruptly at the ends of the transverse arms. By controlling current paths and coupling at the arcuate regions, the antenna can be tuned to resonate efficiently at sub-GHz frequencies while maintaining a low profile suitable for installation in a pit lid or other constrained housing.

Each arcuate half 275, 280, 285, 290 terminates at a respective linear tip slot. In the illustrated embodiment, arcuate halves 275 and 280 terminate at linear tip slots 292 and 294, respectively, and arcuate halves 285 and 290 terminate at linear tip slots 296 and 298, respectively. Each tip slot extends generally radially outward from its associated arcuate half to the periphery of the disc 205. The tip slots 292, 294, 296, 298 are oriented substantially parallel to the central radial feed slot 245, which assists in preserving symmetry and controlling polarization. In the illustrated embodiment, the pair of tip slots associated with a given arcuate slot are collinear, such that tip slots 292 and 294 are collinear with each other and tip slots 296 and 298 are collinear with each other, while the two collinear pairs are parallel to each other. These tip slots provide tuning and coupling functions, including by modifying impedance at the ends of the arcuate slots, enabling fine frequency tuning without increasing disc diameter, and providing controlled peripheral slot openings that define where and how radiation couples out of the structure. The tip slots are the only slot features that reach the disc periphery in the illustrated embodiment, which preserves a largely continuous conductive periphery aside from the controlled openings defined by the tip slots, thereby improving pattern stability and reducing detuning sensitivity.

The arrangement of the slots subdivides the conductive disc 205 into multiple conductive regions, including regions 210, 215, 220 and sections 225 and 230 separated by the slot features. For example, regions 210 and 215 may lie on opposite sides of the central radial feed slot 245, and region 220 may lie on a side of the transverse slot 254 opposite the central radial feed slot. The arcuate slots 267, 272 and tip slots 292, 294, 296, 298, in cooperation with the disc periphery, define separated conductive sections 225 and 230 that participate in the resonant current distribution and radiation mechanism. While the precise distribution of surface current may vary with frequency, substrate properties, and the nearby housing environment, the overall slot geometry is configured to induce circumferential surface currents that circulate around the disc and produce a radiation pattern that is substantially azimuthally omnidirectional in the horizontal plane.

In operation, RF excitation applied by a communication module to the feed region of the antenna causes fields to be established across the central radial feed slot 245 and the connected slot network. The slot network functions as a radiating aperture system, and the surrounding conductive disc 205 supports surface currents that flow along controlled circumferential paths guided by the arcuate slot geometry and constrained by the continuous conductive boundary. The symmetry of the T-shaped junction, the mirrored arrangement of the opposing arcuate slots, and the parallel alignment of the tip slots collectively suppress unwanted pattern distortion and reduce azimuthal nulls. The antenna is therefore capable of producing a hemispherical, substantially omnidirectional radiation pattern in the horizontal plane, which is particularly advantageous for pit-lid installations where device rotation is unpredictable and where near-ground propagation benefits from strong horizontal polarization. In field tests, reception around the antenna has been observed to be strong over 360 degrees, with testers unable to locate a direction having unacceptable reception, which is consistent with an azimuthally omnidirectional horizontal-plane pattern.

The coplanar nature of the antenna and its associated feed network provide additional advantages. Because ground and signal conduction pathways are disposed in the same plane, the antenna may be implemented using a simple manufacturing stack-up, such as a single conductive layer on a dielectric substrate, or other coplanar configurations that avoid complicated multilayer microstrip feed networks. This can reduce cost, improve repeatability, and facilitate integration with housing covers such as cover 100, including by bonding, fastening, overmolding, or otherwise attaching the antenna 200 to the planar surface 110. In some embodiments, the antenna 200 is adhered to the surface 110 using a pressure-sensitive adhesive, epoxy, ultrasonic welding features, mechanical clips, or fasteners, and the feed connection may be made using solder, spring contacts, pogo pins, conductive elastomers, or other coupling structures appropriate for long-life telemetry systems. The antenna may be positioned on the upper surface of the cover to reduce attenuation from underlying components, or it may be positioned on an interior surface where protected, depending on the enclosure design.

The slot openings (including the central radial feed slot, the transverse slot arms, the arcuate slots, and the linear tip slots) may each have a respective slot width selected to provide a desired impedance, coupling, bandwidth, and radiation efficiency for a target operating frequency band and dielectric environment. In nonlimiting embodiments, one or more of the slot widths are substantially uniform along their lengths, while in other embodiments one or more slot widths are tapered, stepped, or locally widened or narrowed at junctions, termini, or coupling regions to provide impedance transformation, resonance trimming, suppression of spurious modes, or improved pattern stability. The slot width may be chosen as a function of the dielectric constant and thickness of the underlying substrate (e.g., FR-4 or another laminate), the conductivity and thickness of the conductive disc, and the intended proximity of the antenna to a housing cover, a meter body, water, soil, concrete, or other materials that may affect effective permittivity and loss. By way of example only, at sub-GHz operating frequencies suitable for utility telemetry, the slot width may be on the order of a small fraction of the disc radius and may be selected within typical manufacturable printed-circuit tolerances (e.g., from about 0.1 mm to about 7 mm, more preferably from about 1 mm to about 5 mm), although wider or narrower slots may be used without departing from the spirit and scope of the invention. In certain embodiments, the slot widths of symmetric features (such as the opposed transverse arms, opposed arcuate slots, and paired tip slots) are maintained substantially equal to preserve balanced excitation and azimuthal omnidirectionality, while permitting controlled variation of the feed-slot width and/or tip-slot width to tune input match and bandwidth.

Although FR-4 is described as a dielectric fill material for the slot openings, other dielectric materials may be used, including higher-frequency laminates, thermoset polymers, or composites. Slot widths, arc radii, and tip lengths may be adjusted to tune the antenna for particular frequency bands such as 433 MHZ, 868 MHz, 915 MHz, or other sub-GHz and near-GHz bands. The antenna is not limited to utility metering and may be applied wherever a low-profile horizontally polarized azimuthally omnidirectional antenna is beneficial, including installations near the ground or near lossy dielectrics.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

The invention claimed is:

1. An antenna apparatus comprising:

a generally planar conductive disc defining a disc radius and having a central region and a peripheral edge;

a dielectric substrate supporting the conductive disc;

a coplanar feed structure disposed in the same plane as the conductive disc and configured to apply a radio-frequency excitation across opposing edges of a slot opening; and a plurality of dielectric-filled slot openings formed through the conductive disc, the plurality of dielectric-filled slot openings including:

a central radial feed slot extending radially outward from the central region and terminating inward of the peripheral edge;

a transverse slot intersecting the central radial feed slot at or near the central region to define a generally T-shaped slot junction having opposed arms extending in opposing directions, each opposed arm terminating inward of the peripheral edge;

a pair of arcuate slots, each arcuate slot intersecting a respective one of the opposed arms, the arcuate slots being concentric with the conductive disc and positioned on opposite sides of an axis defined by the central radial feed slot in mirrored relationship; and a plurality of linear tip slots coupled to ends of the arcuate slots and extending to the peripheral edge, the linear tip slots being oriented substantially parallel to the central radial feed slot;

wherein conductive portions of the conductive disc surrounding the plurality of dielectric-filled slot openings define a radiating structure configured such that, when the coplanar feed structure applies the radio-frequency excitation across the central radial feed slot, circumferential surface currents are induced in the conductive disc; and wherein the antenna apparatus is configured to provide a substantially azimuthally omnidirectional radiation pattern in a horizontal plane.

2. The antenna apparatus of claim 1, wherein the central radial feed slot has a length that is less than the disc radius such that a continuous conductive boundary remains around the peripheral edge of the conductive disc except where interrupted by the linear tip slots.

3. The antenna apparatus of claim 1, wherein each opposed arm has a length of about three-quarters to about seven-eighths of the disc radius.

4. The antenna apparatus of claim 1, wherein each arcuate slot has a radius of curvature that is between about one-half and about seven-eighths of the disc radius.

5. The antenna apparatus of claim 1, wherein each arcuate slot subtends an angle less than 180 degrees.

6. The antenna apparatus of claim 1, wherein the transverse slot bisects each arcuate slot to define two arcuate halves for each arcuate slot.

7. The antenna apparatus of claim 1, wherein the linear tip slots comprise four linear tip slots including two linear tip slots associated with each arcuate slot, wherein the two linear tip slots associated with a given arcuate slot are collinear.

8. A telemetry unit assembly comprising:

a housing enclosing electronics configured to obtain measurement data and to transmit the measurement data using radio-frequency signals;

a cover coupled to the housing, the cover including a rim and a substantially planar surface; and an antenna mounted to the substantially planar surface of the cover, the antenna comprising:

a generally planar conductive disc defining a disc radius and having a central region and a peripheral edge;

a dielectric substrate supporting the conductive disc;

a plurality of dielectric-filled slot openings formed through the conductive disc and defining radiating apertures, the plurality of dielectric-filled slot openings including a central radial feed slot, a transverse slot intersecting the central radial feed slot to form a generally T-shaped slot junction, a pair of arcuate slots intersecting respective arms of the transverse slot and disposed in mirrored relationship, and linear tip slots extending to the peripheral edge;

and a coplanar feed structure coupled between the electronics and the antenna and disposed in the same plane as the conductive disc;

wherein the antenna is configured to provide horizontally polarized, substantially azimuthally omnidirectional radiation in a horizontal plane when excited by the electronics.

9. The telemetry unit assembly of claim 8, wherein the cover includes a window formed in the substantially planar surface for access to a display, an indicator, or a programming interface of the telemetry unit.

10. The telemetry unit assembly of claim 8, wherein an underside of the cover includes ribs configured to increase stiffness of the cover.

11. The telemetry unit assembly of claim 8, wherein the antenna is mounted to the substantially planar surface by an adhesive, a fastener, an overmolded feature, or a mechanical retention feature.

12. The telemetry unit assembly of claim 8, wherein the electronics comprise a communication module configured for sub-GHz operation.

13. The telemetry unit assembly of claim 8, wherein the conductive disc comprises copper and the dielectric-filled slot openings are filled by FR-4.

14. The telemetry unit assembly of claim 8, wherein the cover is configured for use in a pit-lid installation for a water meter, gas meter, or electric meter.

15. A method of operating a telemetry device, comprising:

providing an antenna comprising a generally planar conductive disc supported by a dielectric substrate, the conductive disc having dielectric-filled slot openings formed therethrough that include a central radial feed slot intersecting a transverse slot to form a generally T-shaped slot junction, opposing arcuate slots intersecting respective arms of the transverse slot in mirrored relationship, and linear tip slots extending to a peripheral edge of the conductive disc;

coupling a coplanar feed structure to the antenna such that ground and signal conduction pathways of the coplanar feed structure are disposed in the same plane as the conductive disc;

applying a radio-frequency excitation across opposing edges of the central radial feed slot using the coplanar feed structure;

inducing circumferential surface currents in the conductive disc responsive to the radio-frequency excitation; and transmitting or receiving radio-frequency signals with a substantially azimuthally omnidirectional radiation characteristic in a horizontal plane.

16. The method of claim 15, wherein applying the radio-frequency excitation comprises exciting the antenna in a sub-GHz band.

17. The method of claim 15, wherein inducing circumferential surface currents comprises guiding current flow around the conductive disc using the opposing arcuate slots.

18. The method of claim 15, wherein transmitting or receiving comprises producing a radiation pattern that is hemispherical and substantially horizontally polarized.

19. The method of claim 15, further comprising mounting the antenna to a substantially planar surface of a cover for a telemetry unit housing.

20. The method of claim 19, further comprising deploying the telemetry unit housing in a near-ground or underground environment in proximity to soil, water, concrete, or metal.

* * * * *